US010823057B2

(12) United States Patent
Ribarov et al.

(10) Patent No.: US 10,823,057 B2
(45) Date of Patent: Nov. 3, 2020

(54) OUTLET TUBE VENT WITH FLOW ENERGIZING FEATURES

(71) Applicant: Rohr, Inc., Chula Vista, CA (US)

(72) Inventors: Lubomir A. Ribarov, West hartford, CT (US); Joel H. Frank, La Jolla, CA (US)

(73) Assignee: Rohr, Inc., Chula Vista, CA (US)

( * ) Notice: Subject to any disclaimer, the term of this patent is extended or adjusted under 35 U.S.C. 154(b) by 321 days.

(21) Appl. No.: 15/453,289

(22) Filed: Mar. 8, 2017

(65) Prior Publication Data

US 2018/0258851 A1  Sep. 13, 2018

(51) Int. Cl.
*F02C 7/00* (2006.01)
*F01D 25/32* (2006.01)
(52) U.S. Cl.
CPC .............. *F02C 7/00* (2013.01); *F01D 25/32* (2013.01); *F05D 2240/14* (2013.01); *F05D 2260/601* (2013.01); *F05D 2260/602* (2013.01); *F05D 2260/607* (2013.01); *F05D 2260/608* (2013.01); *F05D 2260/609* (2013.01); *Y02T 50/671* (2013.01); *Y02T 50/675* (2013.01)
(58) Field of Classification Search
CPC .... F02C 7/30; F02C 7/00; F01D 25/32; F05D 2240/14; F05D 2260/601; F05D 2260/602; F05D 2260/607; F05D 2260/608; F05D 2260/609; Y02T 50/671; Y02T 50/675
See application file for complete search history.

(56) References Cited

U.S. PATENT DOCUMENTS

| | | | |
|---|---|---|---|
| 3,199,812 A | 8/1965 | Spoecker | |
| 3,556,444 A | 1/1971 | Kopp | |
| 4,163,366 A | 8/1979 | Kent | |
| 5,285,636 A | 2/1994 | Mayo | |
| 6,571,562 B2 | 6/2003 | Wilcox | |
| 7,121,512 B2 | 10/2006 | Bonnaud | |
| 7,500,384 B2 | 3/2009 | Dumortier | |
| 7,556,223 B2 | 7/2009 | Acheson | |
| 8,117,909 B1 | 2/2012 | LaClair | |
| 8,328,504 B2 | 12/2012 | Russell | |
| 8,511,056 B2 * | 8/2013 | Handley | B64C 1/1453 60/39.08 |
| 9,315,253 B2 | 4/2016 | Lee et al. | |
| 9,340,279 B2 | 5/2016 | Leachman | |
| 9,346,554 B2 | 5/2016 | James | |
| 9,416,801 B2 | 8/2016 | Willie et al. | |
| 2015/0246731 A1 | 9/2015 | Tateiwa | |

* cited by examiner

*Primary Examiner* — Nathaniel E Wiehe
*Assistant Examiner* — John S Hunter, Jr.
(74) *Attorney, Agent, or Firm* — Snell & Wilmer L.L.P.

(57) ABSTRACT

An outlet tube arrangement for an aircraft nacelle may comprise a vent tube defining a vent tube outlet, the vent tube outlet configured to be flush with an outer surface of the aircraft nacelle, and an inner tube disposed within the vent tube, the inner tube configured to increase momentum of fluid flowing through the inner tube to urge the fluid to separate from the inner tube without wetting the aircraft nacelle upon exiting from the vent tube, wherein the inner tube comprises an inner tube inlet comprising an inlet cross-sectional area and an inner tube outlet comprising an outlet cross-sectional area, the inlet cross-sectional area being less than a cross-sectional area of the vent tube at the inner tube inlet, the inlet cross-sectional area being greater than the outlet cross-sectional area, and the inner tube outlet being flush with the vent tube outlet.

20 Claims, 7 Drawing Sheets

OUTLET TUBE VENT WITH FLOW ENERGIZING FEATURES

FIELD

This disclosure relates generally to gas turbine engines, and more particularly to an outlet tube vent tube for an aircraft nacelle.

BACKGROUND

Typically, aircraft engine nacelle drain tubes are fitted in the engine nacelle lower portion. Typically these drain tubes are open to the atmospheric pressure (i.e. "vented") which allows the drain tubes to be designed as light-weight structures, since they are not considered pressure vessels.

Excess or spilled liquid (fuel, oil, hydraulic fluid, water, etc.) inside the engine nacelle may be collected at the bottom of the nacelle and drained through the dedicated drain tube. As the drained fluids may be viscous, an undesirable wetting of the adjacent nacelle surfaces near the drain tube's vent typically occurs. The wetted surfaces are unsightly as they leave stains and/or can attract external debris (dust, sand, etc.) which can become attached to the wetted portions of the nacelles. This may increase the nacelle's surface drag and may thereafter undergo cleaning.

In the case of anti-ice vents, a hot air flow may be exhausted from an anti-ice vent. The flow may exit the vent into a free stream air external from the nacelle. In some cases, the hot air flow may reattach to an outer aerodynamic surface of the nacelle (e.g., the fan cowl) as it exits the nacelle which may cause scorching of the outer surface of the nacelle.

SUMMARY

An outlet tube arrangement for a nacelle is disclosed herein, in accordance with various embodiments. The outlet tube arrangement for the nacelle may comprise a vent tube defining a vent tube outlet, the vent tube outlet configured to be flush with an outer surface of the aircraft nacelle, and an inner tube disposed within the vent tube, the inner tube configured to increase momentum of fluid flowing through the inner tube to urge the fluid to separate from the inner tube without wetting the aircraft nacelle upon exiting from the vent tube, wherein the inner tube comprises an inner tube inlet comprising an inlet cross-sectional area and an inner tube outlet comprising an outlet cross-sectional area, the inlet cross-sectional area being less than a cross-sectional area of the vent tube at the inner tube inlet, the inlet cross-sectional area being greater than the outlet cross-sectional area, and the inner tube outlet being flush with the vent tube outlet.

In various embodiments, the outlet tube arrangement may further comprise at least one fence within the inner tube defining a fence outlet, the at least one fence configured and positioned to prevent the fluid exiting from the vent tube from attaching to at least one of the vent tube, the at least one fence, and the outer surface of the aircraft nacelle. The at least one fence may be configured to cause the fluid exiting the vent tube to separate from the vent tube and from the at least one fence prior to the fluid traveling past the outer surface of the aircraft nacelle. The at least one fence may be configured such that a gap exists between a trailing edge of the vent tube outlet and a trailing edge of the fence outlet. The at least one fence may be configured to prevent the fluid traveling through the vent tube from exiting the vent tube at the trailing edge of the vent tube. The at least one fence may comprise at least one of a "V" shape surface, a concave surface, a convex surface, and a corrugated surface. The inner tube may comprise a funnel. The inner tube may be disposed at a trailing edge of the vent tube outlet. The outlet tube arrangement may further comprise another inner tube disposed at a leading edge of the vent tube outlet.

A nacelle arrangement is disclosed herein, in accordance with various embodiments. The nacelle arrangement may comprise an outer aerodynamic surface exposed to a freestream air and an outlet tube arrangement. The outlet tube arrangement may comprise a vent tube defining a vent tube outlet, the vent tube outlet configured to be flush with an outer surface of the aircraft nacelle, and an inner tube disposed within the vent tube, the inner tube configured to increase momentum of fluid flowing through the inner tube to urge the fluid to separate from the inner tube upon exiting from the vent tube, wherein the inner tube comprises an inner tube inlet comprising an inlet cross-sectional area and an inner tube outlet comprising an outlet cross-sectional area, the inlet cross-sectional area being less than a cross-sectional area of the vent tube at the inner tube inlet, the inlet cross-sectional area being greater than the outlet cross-sectional area, and the inner tube outlet being flush with the vent tube outlet.

In various embodiments, the outlet tube arrangement may further comprise a sculpted fence disposed within the inner tube, the sculpted fence configured to separate the fluid from a trailing edge of the vent tube by a gap. The sculpted fence may comprise an extrusion extending from an inner surface of the inner tube. The extrusion may be tapered along a centerline axis of the inner tube. The sculpted fence may be configured and positioned to prevent the fluid exiting from the vent tube from attaching to at least one of the vent tube, the sculpted fence, and the outer aerodynamic surface. A sculpted fence leading edge surface may comprise at least one of a "V" shape surface, a concave surface, a convex surface, and a corrugated surface. The inner tube may comprise a funnel. The outer aerodynamic surface may comprise at least one of a fan cowl and an inlet. The outlet tube arrangement may further comprise an additional inner tube disposed at a leading edge of the vent tube outlet.

An inner tube is disclosed herein, in accordance with various embodiments. The inner tube may comprise a duct having an inner tube inlet and an inner tube outlet, the inner tube inlet comprises an inlet cross-sectional area and the inner tube outlet comprises an outlet cross-sectional area, the inlet cross-sectional area is greater than the outlet cross-sectional area, the duct configured to be installed within a vent tube of a nacelle, wherein the inner tube outlet is configured to be substantially flush with a vent tube outlet.

In various embodiments, the inner tube may further comprise a sculpted fence disposed on a trailing edge of the inner tube.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
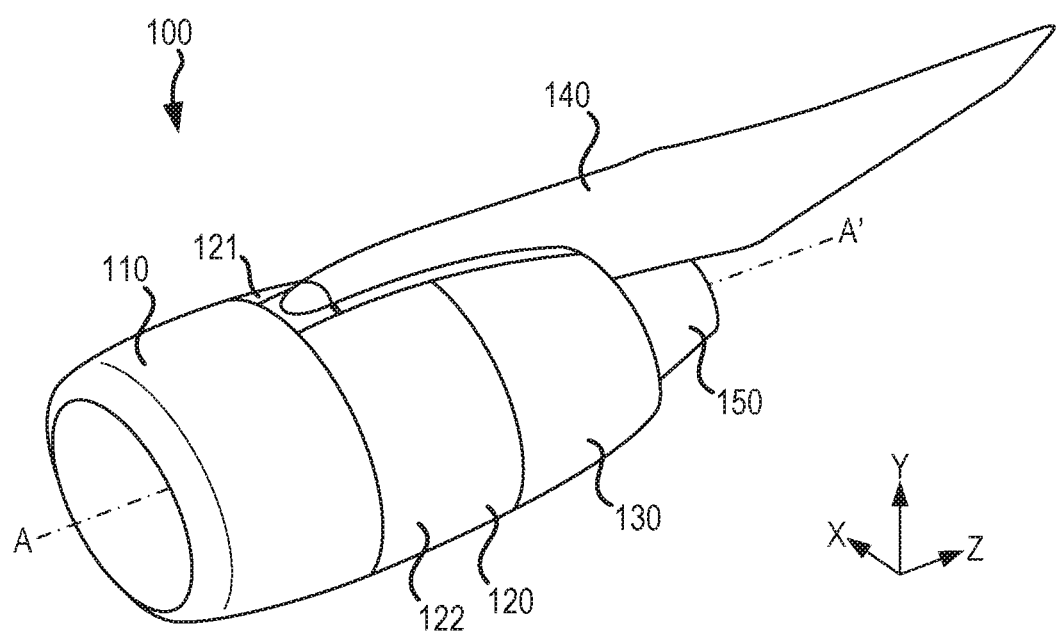
FIG. 1 illustrates a nacelle for a gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

The present disclosure relates to a modified outlet tube arrangement of an aircraft engine nacelle. For example, an outlet tube arrangement may comprise a drainage system for draining fluids from the nacelle or may comprise an anti-ice system for exhausting hot air from the nacelle.

Typically, aircraft engine nacelle drain tubes are fitted in the engine nacelle lower portion. Typically these drain tubes are open to the atmospheric pressure (i.e. "vented") which allows the drain tubes to be designed as light-weight structures, since they are not considered pressure vessels.

Excess or spilled liquid (fuel, oil, hydraulic fluid, water, etc.) inside the engine nacelle may be collected at the bottom of the nacelle and drained through the dedicated drain tube. As the drained fluids may be viscous, an undesirable wetting of the adjacent nacelle surfaces near the drain tube's vent typically occurs. The wetted surfaces are unsightly as they leave stains and/or can attract external debris (dust, sand, etc.) which can become attached to the wetted portions of the nacelles. This may increase the nacelle's surface drag and may thereafter undergo cleaning.

For this reason, in some conventional designs, drain tubes are inserted inside specially designed drain "masts" which protrude from the bottom of the nacelle's lower side. This drain mast may allow for the liquid to escape the drain tube in a safe manner with minimal wetting of the adjacent nacelle surfaces. However, the protrusion of the drain mast into the external air flow represents an unwanted air drag. In addition, in certain engine applications with under-wing podded engines and minimal nacelle-to-ground clearance, the drain mast may become damaged during landing/take/off.

In the case of anti-ice vents, a hot air flow may be exhausted from an anti-ice vent. The flow may exit the vent into free stream air external from the nacelle. In some cases, the hot air flow may reattach to an outer aerodynamic surface of the nacelle (e.g., the fan cowl) as it exits the nacelle, which may cause scorching of the outer surface of the nacelle.

An outlet tube arrangement for an aircraft nacelle, as described herein, may energize a fluid exiting the outlet tube in order to prevent flow reattachment to the aircraft nacelle. Stated differently, the fluid may be concentrated by the geometry of the surfaces of outlet tube arrangement to propel the fluid from the outlet tube arrangement such that the fluid detaches completely from the aircraft nacelle without reattaching. While not being bounded by theory, under the principles of conservation of mass, conservation of energy, and fluid continuum, as the cross-sectional area of an inner tube is decreased, ceteris paribus, the velocity of the fluid increases, thus increasing momentum of the fluid, where momentum is equal to the product of mass and velocity. Stated differently, by concentrating the flow, the velocity of the flow increases, thus increasing momentum of the fluid which may aid in overcoming adhesion to the surfaces of the outlet tube arrangement due to viscosity of the fluid. In various embodiments, as described herein the cross-sectional area of an inner tube may be decreased either by the geometry of the inner tube itself or by a sculpted fence disposed within the inner tube.

With reference to FIG. 1, a nacelle 100 for a gas turbine engine is illustrated according to various embodiments. Nacelle 100 may be suitable for an aircraft. Nacelle 100 may comprise a centerline A-A'. Nacelle 100 may comprise an inlet 110, a fan cowl 120, and a thrust reverser 130. Fan cowl 120 may comprise two halves pivotally mounted to pylon 140, via one or more hinges. In this regard, fan cowl 120 may comprise a first fan cowl 121 (also referred to as a right-hand (RH) fan cowl) and a second fan cowl 122 (also referred to as a left-hand (LH) fan cowl).

In various embodiments, an exhaust nozzle 150 may extend from a turbine engine mounted within nacelle 100. Nacelle 100 may be coupled to a pylon 140, which may mount the nacelle 100 to an aircraft wing or aircraft body.

Figure 2:
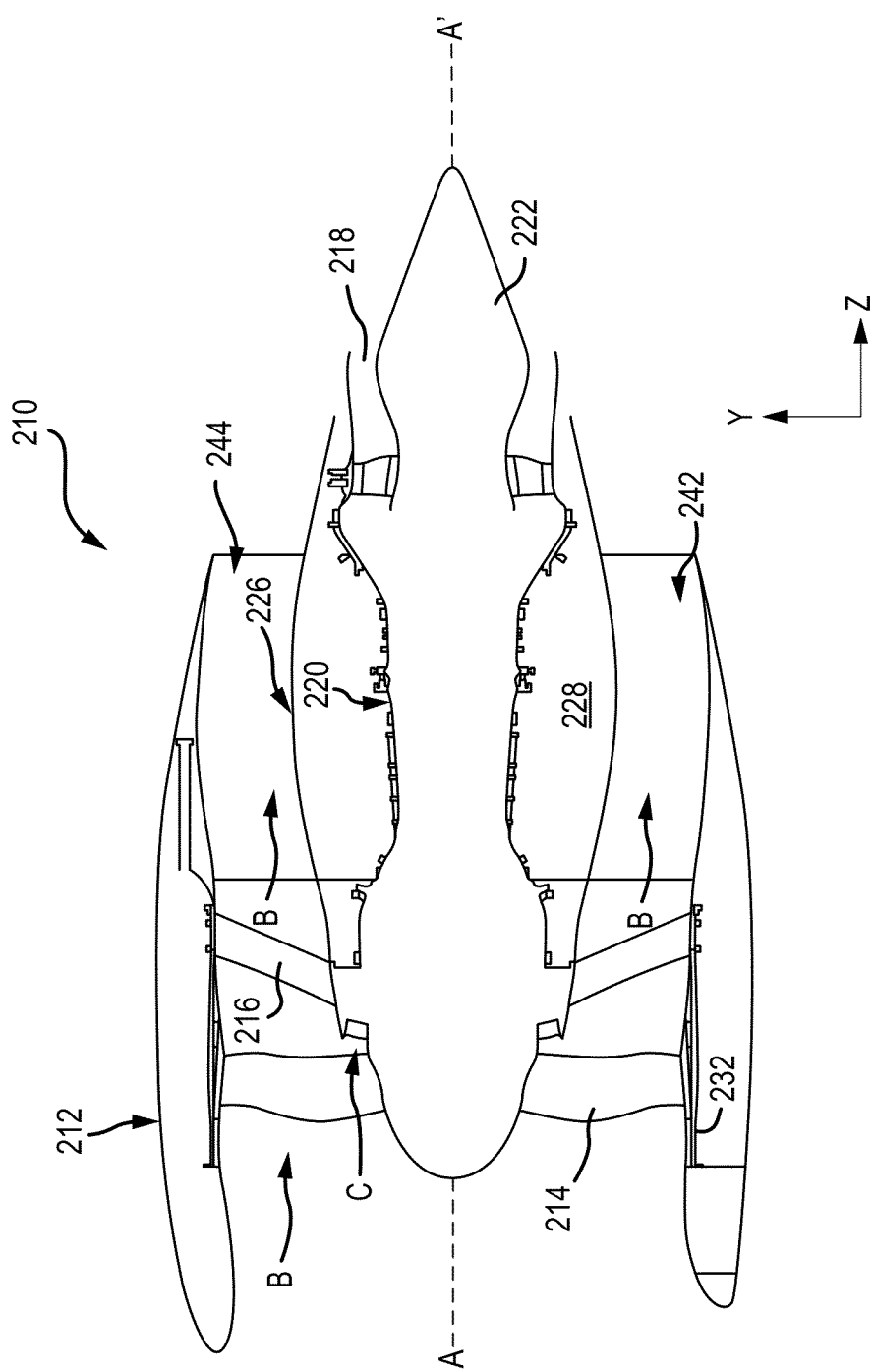
FIG. 2 illustrates a schematic view of a gas turbine engine within a nacelle, in accordance with various embodiments.

FIG. 2 illustrates a schematic view of a gas turbine engine within a nacelle, in accordance with various embodiments. XYZ-axes are provided for ease of illustration. Gas turbine engine 210 may include core engine 220. Core air flow C flows through core engine 220 and is expelled through exhaust outlet 218 surrounding tail cone 222.

Core engine 220 drives a fan 214 arranged in a bypass flow path B. Air in bypass flow-path B flows in the aft direction (z-direction) along bypass flow-path B. At least a portion of bypass flow path B may be defined by nacelle 212 and inner fixed structure (IFS) 226. Fan case 232 may surround fan 214. Fan case 232 may be housed within fan nacelle 212. Fan 214 may rotate about an engine centerline axis A-A'.

Nacelle 212 typically comprises two halves which are mounted to a pylon. According to various embodiments, multiple guide vanes 216 may extend radially between core engine 220 and fan case 232. Upper bifurcation 244 and lower bifurcation 242 may extend radially between the nacelle 212 and IFS 226 in locations opposite one another to accommodate engine components such as wires and fluids, for example.

Inner fixed structure 226 surrounds core engine 220 and provides core compartments 228. Various components may be provided in core compartment 228 such as fluid conduits and/or compressed air ducts, for example.

Figure 3A:
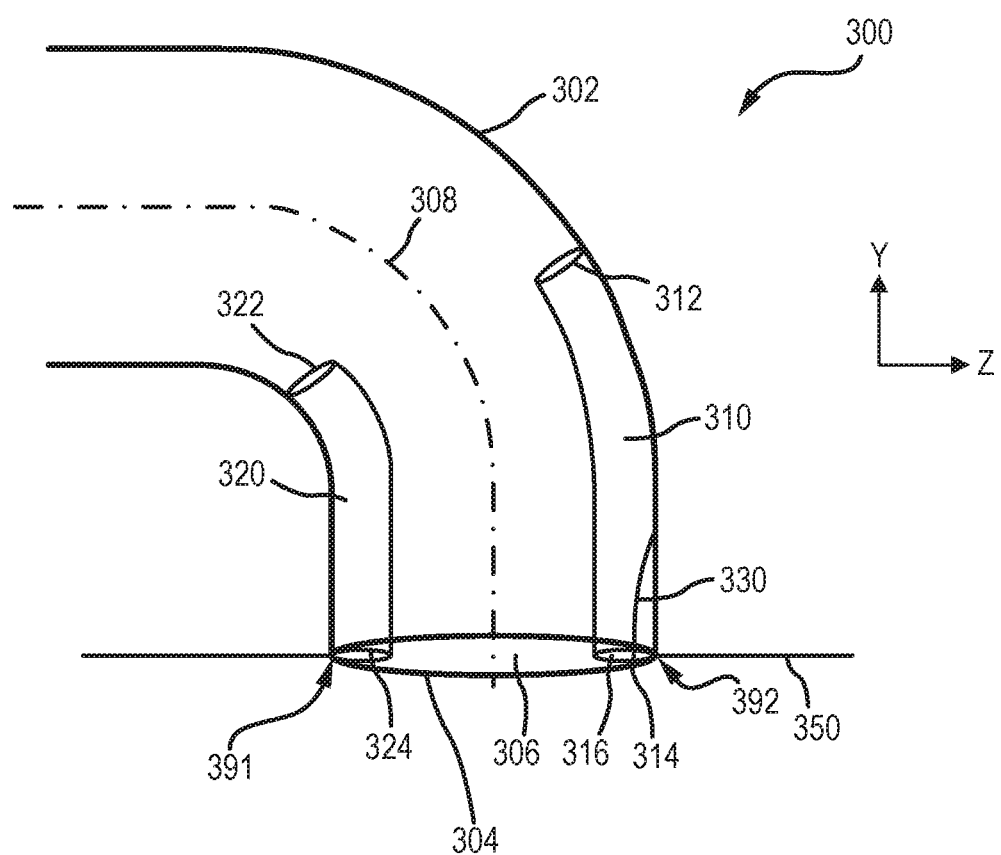
FIG. 3A illustrates an outlet tube arrangement, in accordance with various embodiments.

With reference to FIG. 3A, a perspective view of an outlet tube arrangement 300 for an aircraft nacelle is illustrated, in accordance with various embodiments. Outlet tube arrangement 300 may comprise a vent tube 302. Vent tube 302 may comprise an outlet (also referred to herein as a vent tube outlet) 304. Outlet 304 may be substantially flush with outer aerodynamic surface 350. Vent tube 302 may comprise a leading edge 391 and a trailing edge 392. Vent tube 302 may be coupled to an outer aerodynamic surface 350. In various embodiments, with momentary reference to FIG. 1, outer aerodynamic surface 350 may comprise inlet 110 and/or a fan cowl 120. However, outer aerodynamic surface 350 may comprise any outer surface of nacelle 100.

In various embodiments, outlet tube arrangement 300 may comprise an inner tube (also referred to herein as a first inner tube) 310 disposed at the trailing edge 392 of vent tube 302. Inner tube 310 may comprise an inlet (also referred to herein as a first inner tube inlet) 312 and an outlet (also referred to as a first inner tube outlet) 314. Inner tube 310 may be disposed within vent tube 302. Inner tube 310 may be attached to an inner surface 306 of vent tube 302. Outlet (also referred to herein as a fence outlet) 314 may be substantially flush with outer aerodynamic surface 350.

In various embodiments, outlet tube arrangement 300 may comprise an inner tube (also referred to herein as a second inner tube or another inner tube) 320 disposed at the leading edge 391 of vent tube 302. Inner tube 320 may comprise an inlet (also referred to herein as a second inner tube inlet) 322 and an outlet (also referred to herein as a second inner tube outlet) 324. Inner tube 320 may be disposed within vent tube 302. Inner tube 320 may be attached to an inner surface 306 of vent tube 302. Outlet 324 may be substantially flush with outer aerodynamic surface 350.

In various embodiments, the cross-sectional area (also referred to herein as a vent tube cross-sectional area), of vent tube 302 is larger than the cross-sectional area (also referred to herein as a first inner tube cross-sectional area) of first inner tube 310. The cross-sectional area of vent tube 302 is larger than the cross-sectional area (also referred to herein as a second inner tube cross-sectional area) of second inner tube 320. In various embodiments, the cross-sectional area of inlet 312 is less than the cross-sectional area of vent tube 302 at the location of inlet 312. In various embodiments, the cross-sectional area of inlet 312 is less than half the cross-sectional area of vent tube 302 at the location of inlet 312. In various embodiments, the cross-sectional area of inlet 322 is less than the cross-sectional area of vent tube 302 at the location of inlet 322. In various embodiments, the cross-sectional area of inlet 322 is less than half the cross-sectional area of vent tube 302 at the location of inlet 322. As used herein, a cross-sectional area is measured normal to centerline axis 308 of vent tube 302.

In various embodiments, outlet tube arrangement 300 may comprise a sculpted fence 330 disposed on a trailing edge of the inner tube 310. Sculpted fence 330 may comprise an extrusion extending from the inner surface 316 of inner tube 310. Sculpted fence 330 may be disposed at the trailing edge 392 of vent tube 302. Sculpted fence 330 may, in effect, decrease the cross-sectional area of inner tube 310. Stated differently the cross-sectional area of inner tube 310 may be less along the axial locations of inner tube 310 where sculpted fence is located than it would be without sculpted fence 330. Sculpted fence 330 may be tapered along a centerline axis 308 of vent tube 302. In this regard, the sculpted fence 330 may ramp (or increasingly extend) towards the centerline axis 308 as you move closer towards outlet 314.

Figure 3B:
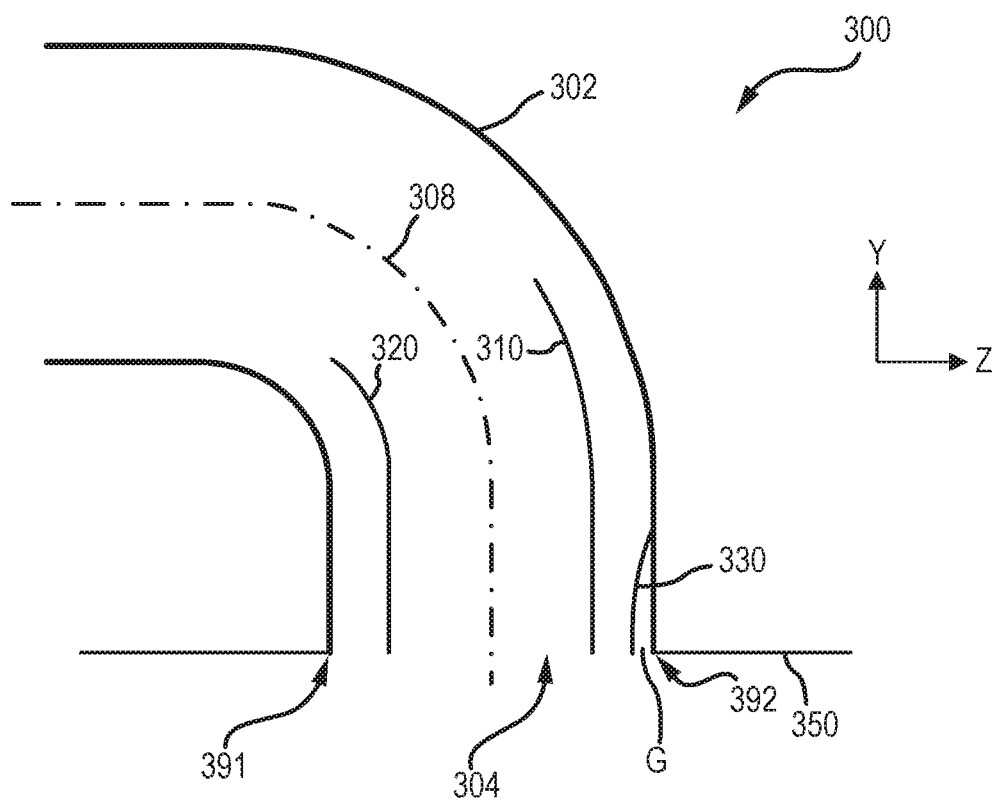
FIG. 3B illustrates a cross-sectional view of the outlet tube arrangement of FIG. 3A, in accordance with various embodiments.

With respect to FIG. 3B, elements with like element numbering, as depicted in FIG. 3A, are intended to be the same and will not necessarily be repeated for the sake of clarity.

With reference to FIG. 3B, a cross-sectional view of the outlet tube arrangement 300 of FIG. 3A is illustrated, in accordance with various embodiments. Sculpted fence 330 may be separated from the wall of vent tube 302 by a gap G at outlet 304. In this regard, as described herein, fluid flow 400 (shown in FIG. 4A) is prevented from reattaching to aerodynamic surface 350 after exiting outlet 304. Furthermore, in this manner sculpted fence 330 is configured to prevent fluid flow 400 traveling through vent tube 302 from exiting the vent tube 302 at the trailing edge 392 of the vent tube 302, but rather, at the trailing edge of sculpted fence 330. Stated differently, fluid flow 400 may be ramped away from the interior wall of the vent tube 302 via sculpted fence 330, thereby forcing fluid flow 400 to exit at outlet 314.

Figure 4A:
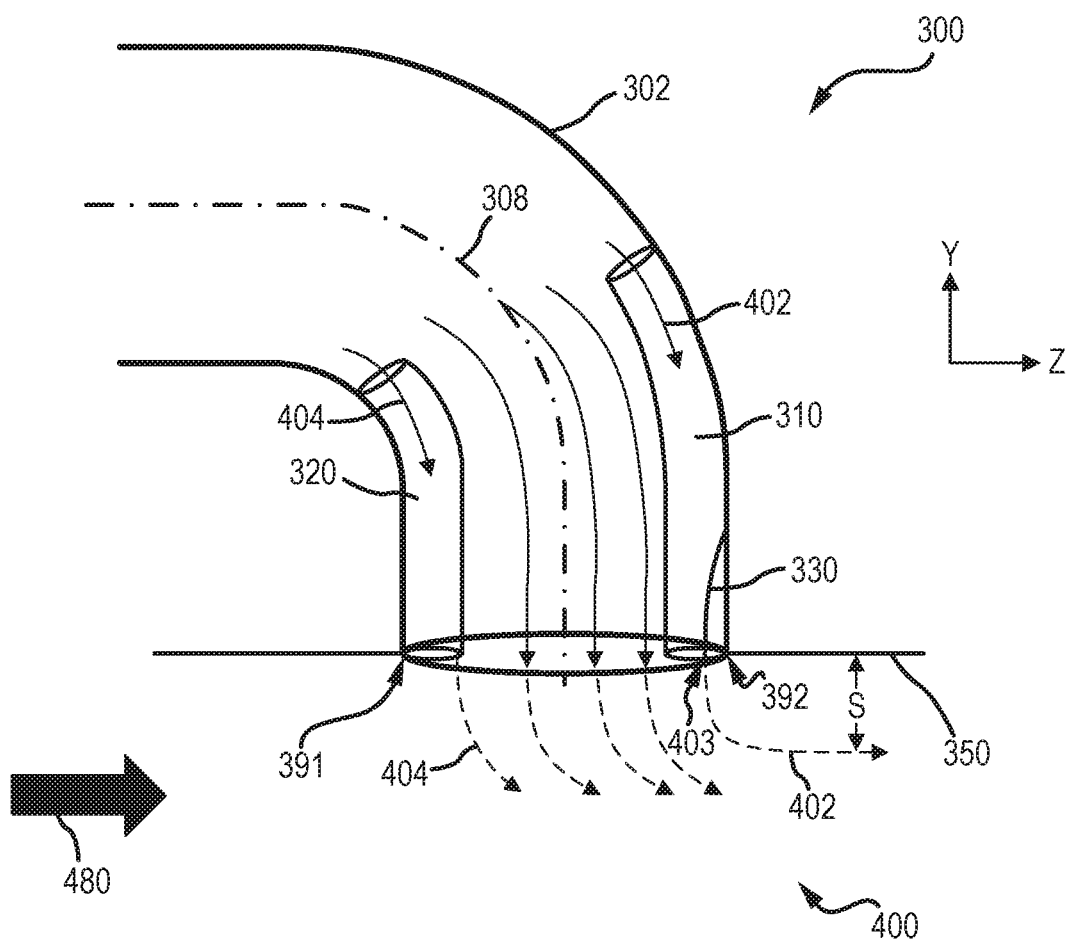
FIG. 4A and FIG. 4B illustrate the outlet tube arrangement of FIG. 3A with a fluid flowing through the outlet tube arrangement and exiting into a freestream flow, in accordance with various embodiments.
Figure 4B:
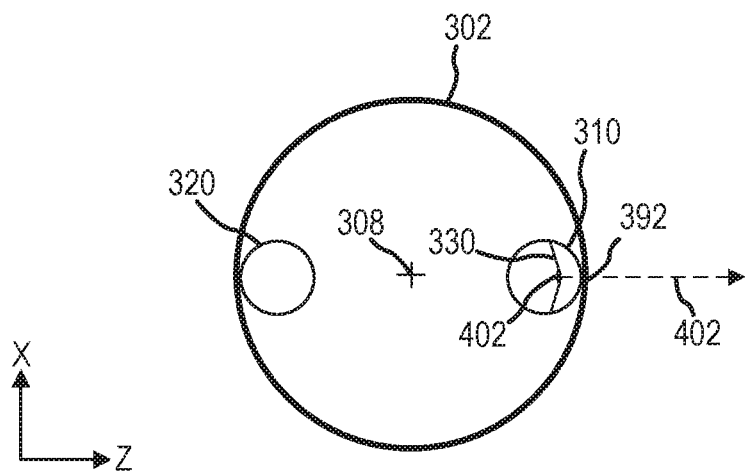

With reference to FIG. 4A, a perspective view of outlet tube arrangement 300 is illustrated in operation with a fluid flow 400 exiting vent tube 302, inner tube 310, and inner tube 320. With reference to FIG. 4B, an axial view of outlet tube arrangement 300 is illustrated in operation with a fluid flow 400 exiting vent tube 302, inner tube 310, and inner tube 320. With combined reference to FIG. 4A and FIG. 4B, outlet tube arrangement 300 may be configured to energize fluid flow 400 along the centerline axis 308 of vent tube 302 so that momentum of fluid flow 400 will cause fluid flow 400 to separate from outlet tube arrangement 300 upon exiting outlet tube arrangement 300. Outlet tube arrangement 300 may increase the momentum of fluid flow 400. Freestream air, represented by arrow 480, flows in an aft direction (i.e., the z-direction) relative to outlet tube arrangement 300. In this regard, the freestream air tends to direct fluid flow 400 aft-wards as fluid flow 400 exits outlet tube arrangement 300. With combined reference to FIG. 3A, FIG. 4A, and FIG. 4B, inner tube 310 may collect a portion 402 of fluid flow 400 at inlet 312 and the portion 402 of fluid flow 400 may be concentrated within inner tube 310, thereby energizing the portion 402 of fluid flow 400 and increasing momentum as the portion 402 of fluid flow 400 exits outlet 314 to prevent the portion 402 of fluid flow 400 from reattaching to outer aerodynamic surface 350. In various embodiments, the geometry of sculpted fence 330 may aid in concentrating fluid flow 400. Sculpted fence 330 may direct the portion 402 of fluid flow 400 away from outer aerodynamic surface 350. Sculpted fence 330 may direct the portion 402 of fluid flow 400 away from outer aerodynamic surface 350 by a separation distance S. Portion 402 of fluid flow 400 may separate from sculpted fence 330 at point of separation 403. Similarly, (but without a sculpted inner fence 330) a portion 404 of fluid flow 400 may be energized via inner tube 320. In this regard, sculpted fence 330 may cause fluid flow 400 exiting vent tube 302 to separate from vent tube 302 and from sculpted fence 330 prior to fluid flow 400 traveling past aerodynamic surface 350 of the aircraft nacelle.

In various embodiments, fluid flow 400 may comprise oil leaked from various engine components within the nacelle. In various embodiments, fluid flow 400 may comprise a hydraulic fluid leaked from various engine components within the nacelle. In various embodiments, fluid flow 400 may comprise a heated air exhausted from an anti-ice system of the nacelle. In various embodiments, fluid flow 400 may comprise any other suitable fluid flow wherein it is desirable to prevent the fluid flow from reattaching to an outer portion of a nacelle.

Figure 5:
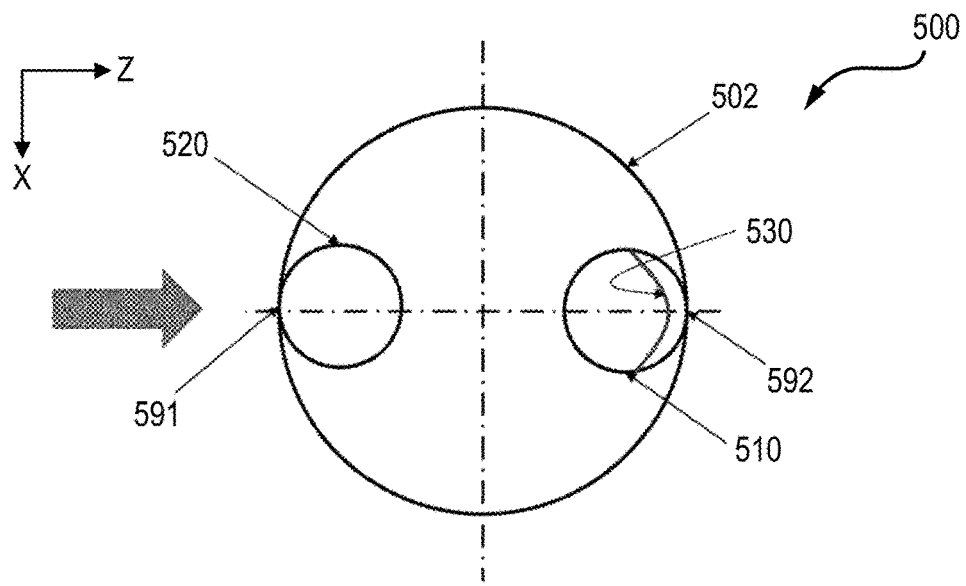
FIG. 5 illustrates an axial view of an outlet tube arrangement, in accordance with various embodiments.
Figures 6A, 6B, 6C:
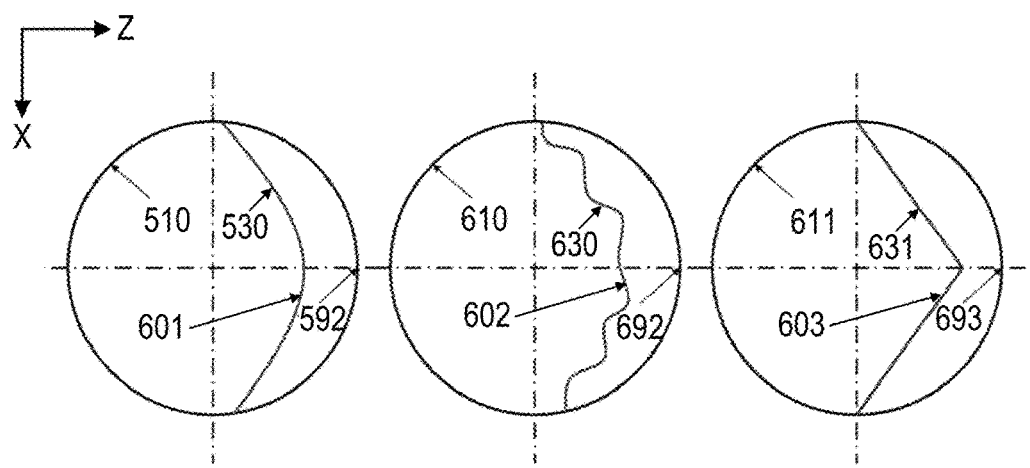
FIG. 6A, FIG. 6B, FIG. 6C, and FIG. 6D illustrate various sculpted fence geometries, in accordance with various embodiments.
Figure 6D:
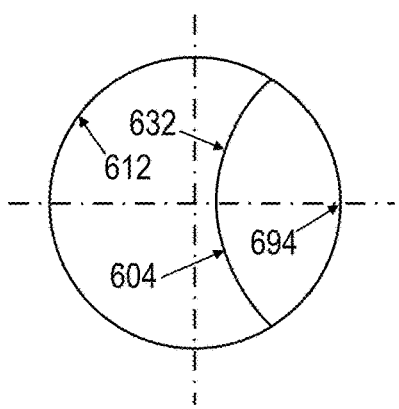

With reference to FIG. 5, an axial view of an outlet tube arrangement 500 is illustrated, in accordance with various embodiments. Outlet tube arrangement 500 may comprise a vent tube 502, an inner tube (also referred to herein as a first inner tube) 510, an inner tube (also referred to herein as a second inner tube) 520, and a sculpted fence 530 forward of trailing edge 592 of vent tube 502. Inner tube 510 may be disposed at the trailing edge 592 of vent tube 502. Inner tube 520 may be disposed at the leading edge 591 of vent tube 502. In various embodiments, vent tube 502 may be circular, elliptical, square, polygonal, rectangular, or any other geometry. In various embodiments, inner tube 510 may be circular, elliptical, square, polygonal, rectangular, or any other geometry. In various embodiments, inner tube 520 may be circular, elliptical, square, polygonal, rectangular, or any other geometry.

With combined reference to FIG. 6A, FIG. 6B, FIG. 6C, and FIG. 6D, a plurality of inner tubes having various sculpted fence geometries is illustrated, in accordance with various embodiments. Inner tube 510, inner tube 610, inner tube 611, and inner tube 612 are illustrated with sculpted fence 530, sculpted fence 630, sculpted fence 631, and sculpted fence 632, respectively coupled to trailing edge 592, trailing edge 692, trailing edge 693, and trailing edge 694. In this regard, a sculpted fence may comprise various surface geometries to alter flow characteristics of a fluid flowing through an inner tube. Sculpted fence 530 comprises a concave surface 601 (as shown in FIG. 5). In this regard, a fluid flow may be concentrated along the center of concave surface 601. Sculpted fence 630 comprises a corrugated surface 602. In this regard, a fluid flow may be concentrated along the channels of corrugated surface 602. Sculpted fence 631 comprises a "V" shape surface 603. In this regard, a fluid flow may be concentrated along the center of the "V" shape surface 603. Sculpted fence 632 comprises a convex surface 604. In this regard, a fluid flow may be concentrated along the edges of convex surface 604. In various embodiments, the sculpted fence may be formed to have a smooth surface to minimize surface area and aid in moving a fluid flow. In various embodiments, the sculpted fence may be coated with a hydrophobic material to promote separation of a fluid flow from the sculpted fence.

Advanced additive manufacturing (AAM) methods can be used to sculpt the proper shape, size, and orientation of the sculpted fence as it is imbedded into the inner tube of the vent tube vent. Also, AAM methods can be used to produce the entire vent tube with the inner tube sculpted fence embedded into the vent tube as one monolithic piece.

These AMM methods can include (but are not limited to) selective laser sintering (SLS) or direct metal laser sintering (DMLS), in which a layer of metal or metal alloy powder is applied to the working piece being fabricated and selectively sintered according to the digital model with heat energy from a directed laser beam.

Another type of metal-forming process includes selective laser melting (SLM) or electron beam melting (EBM), in which heat energy provided by a directional laser or electron beam is used to selectively melt (instead of sinter) the metal powder so that it fuses as it cools and solidifies.

Another AAM process that can be used for metals (or polymers) is fused deposition modeling (FDM), in which a metal (or thermoplastic) feed material (e.g., in the form of wire or filament) is heated and selectively dispensed onto the work piece through an extrusion nozzle. A benefit of the FDM technique is that it may produce polymer-based components (i.e. the entire fuel vent tube) which may result in weight savings.

Figures 7A, 7B:
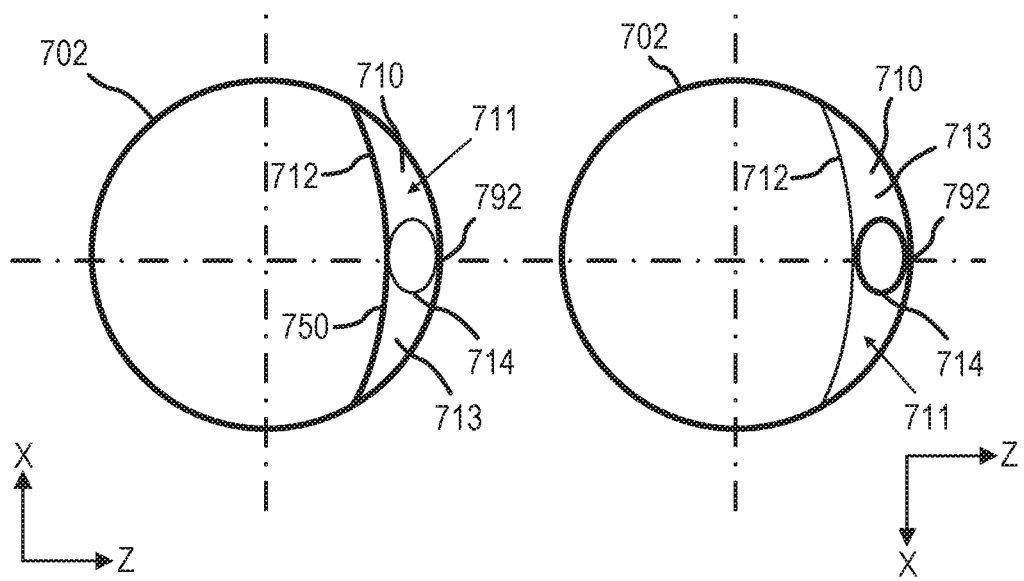
FIG. 7A illustrates an axial view of a vent tube looking from an inlet of an inner tube towards an outlet of the inner tube, in accordance with various embodiments.
FIG. 7B illustrates an axial view of the vent tube of FIG. 7A, looking from the outlet of the inner tube towards the inlet of the inner tube, in accordance with various embodiments.

With reference to FIG. 7A, an axial view of a vent tube 702 looking from an inlet 712 of an inner tube 710 towards the outlet 714 of the inner tube 710 is illustrated, in accordance with various embodiments. With reference to FIG. 7B, an axial view of the vent tube 702 looking from the outlet 714 of the inner tube 710 towards the inlet 712 of the inner tube 710 is illustrated, in accordance with various embodiments. Vent tube 702 may comprise a trailing edge 792. Inner tube 710 may comprise a duct 713 extending between inlet 712 and outlet 714. Duct 713 may be installed within vent tube 702. Surface 750 of inlet 712 may be either concave-shaped or convex-shaped. Although illustrated as having a crescent shape, it is contemplated herein that inlet 712 may comprise any suitable geometry. Although illustrated as having an oval shape, it is contemplated herein that outlet 714 may comprise any suitable geometry.

With combined reference to FIG. 7A and FIG. 7B, inner tube 710 may comprise a funnel 711. In this regard, inlet 712 may be larger than outlet 714. Stated differently, the cross-sectional area of inlet 712 may be larger than the cross-sectional area of outlet 714. In this regard, a portion of a fluid flow collected by outlet 714 may be energized, or concentrated, as it flows towards the smaller outlet 714 of inner tube 710. In this manner, inner tube 710 may be configured to concentrate a flow of a fluid as it flows from inlet 712 towards outlet 714. Although FIG. 7C illustrates that the cross-sectional area of inner tube 710 is reduced by the geometry of inner tube 710, it should be appreciated that a sculpted fence (e.g., sculpted fence 330 of FIG. 3A) also reduces the cross-sectional area of the inner tube, in addition to separating the fluid from the trailing edge of the inner tube.

Figure 7C:
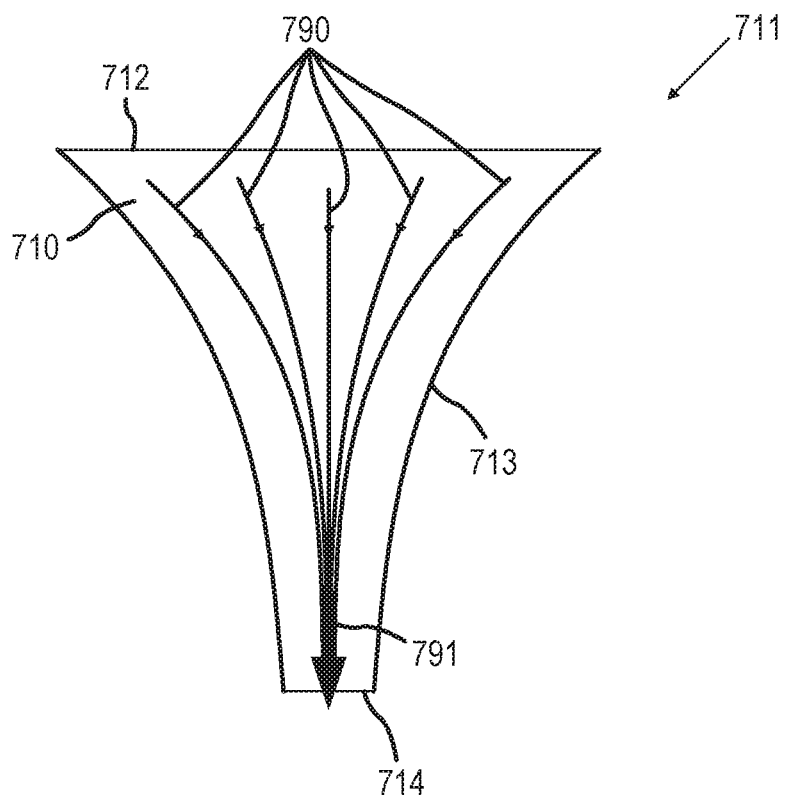
FIG. 7C illustrates a side, cross-sectional view of the inner tube of FIG. 7A and FIG. 7B, in accordance with various embodiments.

For example, with reference to FIG. 7C, a cross-section view of inner tube 710 is illustrated, in accordance with various embodiments. A plurality of streamlines 790 of a fluid may be concentrated into a single streamline 791 of fluid via funnel 711, thereby concentrating the fluid. In this regard, the momentum of the fluid in streamline 791 may be greater than the momentum of the fluid of streamlines 790. In this regard, the fluid flow may be energized (i.e., the momentum of the fluid is increased).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An outlet tube arrangement for an aircraft nacelle, comprising:
  a vent tube defining a vent tube outlet, the vent tube outlet configured to be flush with an outer surface of the aircraft nacelle; and
  an inner tube disposed within the vent tube, the inner tube configured to increase momentum of fluid flowing through the inner tube to urge the fluid to separate from the inner tube without wetting the aircraft nacelle upon exiting from the vent tube,
  wherein the inner tube comprises an inner tube inlet comprising an inlet cross-sectional area and an inner tube outlet comprising an outlet cross-sectional area,
  the inlet cross-sectional area is less than a cross-sectional area of the vent tube at the inner tube inlet,
  the inlet cross-sectional area is greater than the outlet cross-sectional area,
  the inner tube outlet is flush with the vent tube outlet,
  a first flow path is defined externally from the inner tube and the first flow path is within the vent tube, and
  a second flow path is defined internally through the inner tube, and the first flow path is in parallel with the second flow path.

2. The outlet tube arrangement of claim 1, further comprising at least one fence within the inner tube defining a fence outlet, the at least one fence configured and positioned to prevent the fluid exiting from the vent tube from attaching to at least one of the vent tube, the at least one fence, and the outer surface of the aircraft nacelle.

3. The outlet tube arrangement of claim 2, wherein the at least one fence is configured to cause the fluid exiting the vent tube to separate from the vent tube and from the at least one fence prior to the fluid traveling past the outer surface of the aircraft nacelle.

4. The outlet tube arrangement of claim 2, wherein the at least one fence is configured such that a gap exists between a trailing edge of the vent tube outlet and a trailing edge of the fence outlet.

5. The outlet tube arrangement of claim 2, wherein the at least one fence is configured to prevent the fluid traveling through the vent tube from exiting the vent tube at the trailing edge of the vent tube.

6. The outlet tube arrangement of claim 2, wherein the at least one fence comprises at least one of a "V" shape surface, a concave surface, a convex surface, and a corrugated surface.

7. The outlet tube arrangement of claim 1, wherein the inner tube comprises a funnel.

8. The outlet tube arrangement of claim 1, wherein the inner tube is disposed at a trailing edge of the vent tube outlet.

9. The outlet tube arrangement of claim 8, further comprising another inner tube disposed at a leading edge of the vent tube outlet.

10. A nacelle arrangement, comprising:
  an outer aerodynamic surface exposed to a freestream air;
  an outlet tube arrangement, comprising:
    a vent tube defining a vent tube outlet, the vent tube outlet configured to be flush with an outer surface of the aircraft nacelle; and
    an inner tube disposed within the vent tube, the inner tube configured to increase momentum of fluid flowing through the inner tube to urge the fluid to separate from the inner tube upon exiting from the vent tube,
    wherein the inner tube comprises an inner tube inlet comprising an inlet cross-sectional area and an inner tube outlet comprising an outlet cross-sectional area,
    the inlet cross-sectional area being less than a cross-sectional area of the vent tube at the inner tube inlet,
    the inlet cross-sectional area being greater than the outlet cross-sectional area, the inner tube outlet being flush with the vent tube outlet, a first flow path is defined externally from the inner tube and the first flow path is within the vent tube, and a second flow path is defined internally through the inner tube, and the first flow path is in parallel with the second flow path.

11. The nacelle arrangement of claim 10, wherein the outlet tube arrangement further comprises a sculpted fence disposed within the inner tube, the sculpted fence configured to separate the fluid from a trailing edge of the vent tube by a gap.

12. The nacelle arrangement of claim 11, wherein the sculpted fence comprises an extrusion extending from an inner surface of the inner tube.

13. The nacelle arrangement of claim 12, wherein the extrusion is tapered along a centerline axis of the inner tube.

14. The nacelle arrangement of claim 11, wherein the sculpted fence is configured and positioned to prevent the fluid exiting from the vent tube from attaching to at least one of the vent tube, the sculpted fence, and the outer aerodynamic surface.

15. The nacelle arrangement of claim 11, wherein a sculpted fence leading edge surface comprises at least one of a "V" shape surface, a concave surface, a convex surface, and a corrugated surface.

16. The nacelle arrangement of claim 11, wherein the outlet tube arrangement further comprises an additional inner tube disposed at a leading edge of the vent tube outlet.

17. The nacelle arrangement of claim 10, wherein the inner tube comprises a funnel.

18. The nacelle arrangement of claim 10, wherein the outer aerodynamic surface comprises at least one of a fan cowl and an inlet.

19. An inner tube, comprising:

a duct having an inner tube inlet and an inner tube outlet, the inner tube inlet comprises an inlet cross-sectional area and the inner tube outlet comprises an outlet cross-sectional area;

the inlet cross-sectional area is greater than the outlet cross-sectional area; and the duct is configured to be installed within a vent tube to define a first flow path externally from the inner tube and within the vent tube and to further define a second flow path internally through the inner tube, wherein the first flow path is in parallel with the second flow path.

20. The inner tube of claim 19, further comprising a sculpted fence disposed on a trailing edge of the inner tube, wherein the sculpted fence extends inward from an inner surface of the duct.

* * * * *